(12) United States Patent
Babej (10) Patent No.: US 8,734,071 B2
(45) Date of Patent: May 27, 2014

(54) FUNCTIONAL ELEMENT IN THE FORM OF A PRESS-IN ELEMENT

(75) Inventor: Jiri Babej, Lich (DE)

(73) Assignee: Profil-Verbindungstechnik GmbH & Co. KG, Friedrichsdorf (DE)

( * ) Notice: Subject to any disclaimer, the term of this patent is extended or adjusted under 35 U.S.C. 154(b) by 144 days.

(21) Appl. No.: 13/347,076

(22) Filed: Jan. 10, 2012

(65) Prior Publication Data

US 2012/0189402 A1 Jul. 26, 2012

(30) Foreign Application Priority Data

Jan. 20, 2011 (DE) .......................... 10 2011 009 012

(51) Int. Cl.
*F16B 37/06* (2006.01)

(52) U.S. Cl.
CPC .................................... *F16B 37/068* (2013.01)
USPC ........................................................ 411/180

(58) Field of Classification Search
USPC .......................................... 411/107, 179–181
See application file for complete search history.

(56) References Cited

U.S. PATENT DOCUMENTS

| | | | | |
|---|---|---|---|---|
| 2,544,304 A * | 3/1951 | Eckenbeck et al. | ............ | 411/180 |
| 3,399,409 A | 9/1968 | Breed | | |
| 3,399,705 A * | 9/1968 | Breed et al. | ..................... | 411/180 |
| 4,543,023 A * | 9/1985 | Capuano | ....................... | 411/180 |
| 4,966,512 A * | 10/1990 | Takaku | .......................... | 411/181 |
| 5,513,933 A * | 5/1996 | Rom | ............................... | 411/180 |
| 6,125,524 A * | 10/2000 | Mueller | ............................ | 29/520 |
| 6,190,102 B1 * | 2/2001 | Vignotto et al. | .............. | 411/399 |
| 6,409,444 B2 * | 6/2002 | Pamer et al. | .................. | 411/180 |
| 6,712,370 B2 * | 3/2004 | Kawada et al. | ......... | 280/124.155 |
| 8,096,743 B2 * | 1/2012 | Babej | ........................... | 411/179 |

FOREIGN PATENT DOCUMENTS

| | | |
|---|---|---|
| DE | 195 35 537 A1 | 3/1997 |
| DE | 37 04 763 C1 | 10/1998 |
| DE | 200 12 097 U1 | 2/2001 |
| DE | 103 53 642 A1 | 7/2005 |
| DE | 10 2006 062 073 A1 | 7/2007 |
| DE | 10 2007 034 987 A1 | 1/2009 |

(Continued)

OTHER PUBLICATIONS

German Search Report in corresponding German Patent Application No. 10 2011 009 012.6 dated Jan. 3, 2012.

(Continued)

*Primary Examiner* — Flemming Saether
(74) *Attorney, Agent, or Firm* — Hershkovitz & Associates, PLLC; Abraham Hershkovitz; Eugene Rzucidlo (57) ABSTRACT

The invention relates to a functional element in the form of a press-in element for attachment to a sheet metal part, wherein the functional element has a head part and a shaft part, the head part has a ring-shaped sheet metal contact surface at the side adjacent the shaft part and a ring-shaped axial recess inside this ring-shaped sheet metal contact surface and surrounding the shaft part at the transition from the head part into the shaft part. In accordance with the invention the shaft part has a plurality of circumferentially distributed radial recesses extending in the axial direction and between these noses which likewise extend axially and project radially, wherein raised material portions are present at the positions of the radial recesses at their axial ends adjacent the head part and form undercuts with the head part in the region of the ring-shaped recess.

16 Claims, 8 Drawing Sheets

(56) References Cited

FOREIGN PATENT DOCUMENTS

| | | |
|---|---|---|
| EP | 678 679 | 10/1995 |
| EP | 759 510 | 2/1997 |
| EP | 1 116 891 A1 | 7/2001 |
| EP | 2141370 A1 | 1/2010 |
| WO | WO 2005/050034 A1 | 6/2005 |

OTHER PUBLICATIONS

English language translation of German Search Report in corresponding German Patent Application No. 10 2011 009 012.6 dated Jan. 3, 2012.

English language translation of European Search Report dated May 5, 2012 for European Patent Application No. 12000051.8.

* cited by examiner

FUNCTIONAL ELEMENT IN THE FORM OF A PRESS-IN ELEMENT

CROSS-REFERENCE TO RELATED APPLICATIONS

This application claims priority of German Patent Application No. 10 2011 009 012.6, filed Jan. 20, 2011, the disclosure of which is expressly incorporated by reference herein in its entirety.

FIELD OF THE INVENTION

The present invention relates to a functional element in the form of a press-in element for attachment to a sheet metal part. The functional element can either be formed as a male element or as a female element. As a male element a bolt element can be considered whose shaft part is provided with a thread, or an element whose shaft part is provided with a mount for a clip or the like, or an element whose shaft part is made cylindrical and serves as a journal for a component rotatable on an element.

BACKGROUND OF THE INVENTION

For a female element a nut element can principally be considered, i.e. an element having an internal thread, with the shaft part being able to be formed as a piercing section so that a self-piercing nut element is present. The thread does not have to be pre-manufactured but rather could be produced after the attachment of the nut element to a sheet metal part by means of a thread forming or thread cutting screw. The female element can however also be a hollow element with a cylindrical hollow space which serves for the rotatable journaling of a shaft.

Functional elements are known in the prior art in most diverse embodiments. On the one hand there are so-called rivet elements which have a rivet section, which is deformed on attachment to a sheet metal part, in order to form a rivet bead which together with the head part forms a ring-shaped recess for receiving the edge of a hole in a sheet metal part. With that rivet element the functional element is thus deformed on attachment to the sheet metal part. Typical examples for such rivet elements are the NBR bolt elements of the present applicants and the RND nut elements of the present applicants (European patent 1116891). Furthermore, so-called press-in elements are well known in which the element itself is not intentionally deformed on attachment to a sheet metal part but rather the sheet material itself is deformed, in order to bring this into engagement with undercuts of the respective press-in element. Various bolt elements and nut elements are also known here.

The so-called EBF bolts of the present applicants (European patent 678679) can be named as bolt elements and the so-called RSU elements (European patent 759510) of the present applicants can be named as nut elements.

SUMMARY OF THE INVENTION

The object of the present invention is to make available a functional element in the form of a press-in element, which represents an alternative to the EBF element or to the RSU element, which can be manufactured in problem-free manner and which offers an appropriate security against rotation and an appropriate axial press-out resistance.

A security against rotation of this kind is necessary so that on attachment of the functional element to a sheet metal part and the subsequent attachment of a nut on the bolt element, or the introduction of a bolt element to a nut element in order to secure a further component against the sheet metal part, not inconsiderable torques arise which could otherwise lead to loosening of the bolt element or of the nut element. Such torques also arise on releasing the corresponding threaded joint. Furthermore, an axial press-out resistance and also a button-out resistance are of importance because sheet metal parts which are provided with the respective functional elements are frequently transported as bulk material in a box from one factory to another, or within one factory. This can lead to loosening of the functional element in the individual sheet metal parts, which is disadvantageous for the later processing. Furthermore, on the attachment of a further component to the sheet metal part equipped with the functional element, automatic assembly tools for screws and nuts are frequently used which, on attachment of a nut to a bolt element or on screwing a bolt into a nut element, exert not inconsiderable axial forces on the respective functional element. Through this the danger of loosening of the functional element in the sheet metal part, or of failure of connection between the sheet metal part and the functional element exists when the press-out resistance and the button-out resistance are not guaranteed to the required degree.

In order to satisfy the above-named object a functional element in accordance with claim 1 is first provided. I.e. a functional element is provided in the form of a press-in element for attachment to a sheet metal part, wherein the functional element has a head part and a shaft part, the head part has a ring-shaped sheet metal contact surface at the side adjacent the shaft part and a ring-shaped axial recess inside this ring-shaped sheet metal contact surface and surrounding the shaft part at the transition from the head part into the shaft part, with the functional element being characterized in that the shaft part has a plurality of circumferentially distributed radial recesses extending in the axial direction and between these noses which likewise extend axially and project radially. Raised material portions are preferably present at the positions of the radial recesses, at their axial ends adjacent the head part and form undercut with the head part in the region of the ring-shaped recess.

Through a design of the functional element of this kind the sheet metal material can be brought into close contact with the radially projecting noses or with the base surface of the radial recesses, so that a security against rotation is achieved here and in particular at the preferably radially directed flanks of the noses. Moreover, the sheet metal material can be brought into the said undercuts which are formed by the raised material portions, whereby an axial press-out resistance is generated. Furthermore, the sheet metal part can, when considered in circumferential direction, contact the lateral boundaries of the raised material portions, whereby an additional security against rotation is generated.

With the formation of the shaft part as a thread, the sheet metal material is furthermore so deformed that the region of the sheet metal material remote from the head part of the functional element lies opposite to the axial end of the thread adjacent the head part and radially within the outer diameter of the thread.

Since the thread takes place through a thread rolling process after the manufacture of the radial recesses and of the noses, the increased size of the shaft part which is associated with the thread rolling favors the prior manufacture of the radial recesses and noses, because the shaft part then has a smaller diameter in the region of the thread which has yet to be manufactured, which simplifies the production of the set recesses and noses by the axial displacement of the material of the shaft part. If this situation were not present, the radial recesses would have to be produced by a radial deformation of the shaft part, which would basically be possible.

The increasing diameter in the region of the thread after its manufacture forms a thread run-out adjacent the axial ends of the said recesses and noses remote from the head part, which serves as a abutment for the sheet metal material and ensures the press-out resistance. If the said raised material portions and the corresponding undercuts are provided, then the engagement of the sheet metal part into the undercuts supplements the press-out resistance. If the thread run-out is not present in the bolt element then the engagement of the sheet metal material in the undercuts itself provides the required form-fitted connection to generate the press-out resistance.

In a female element a corresponding region of increased diameter and serving as a stop can be provided at the free end portion of the shaft part and ensure the press-out resistance in corresponding manner through the thread run-out ensures the press-out resistance. Should a shape of this kind not be present then the presence of the said undercuts and an engagement of the sheet metal material is required, in order to generate the required form-fitted connection to generate the press-out resistance.

Even if a slight loosening of the functional element occurs, an axial loss of the elements is not straight-forwardly possible because the sheet metal material abuts against the end of the thread. A security of this kind is also present with the design at a nut element, provided the shaft part has a larger diameter at the side of the noses and the axial recesses remote from the head part than in the region of the noses, whereby the functional element cannot be pressed out of the sheet metal part. A pressing out of this kind is avoided because the shoulder which is present at the transition to the region having a larger diameter abuts against the side of the sheet metal part remote from the head part of the nut element or will abut against it.

In both variants, i.e. as a male element or female element, an axial loss of the element in the other direction is not possible, simply because the radial sheet metal contact surface of the head part contacts the sheet metal part and has a significantly larger diameter than the hole in the sheet metal part. Thus, an axial loss is prevented in both axial directions.

Furthermore, on the attachment of the functional element, the sheet metal material is brought axially within the ring-shaped recess and radially against the circumferentially alternating projecting noses in the radial recesses into contact, whereby a particularly stable form results, which is resistant to button-out forces. The hole friction which arises there also assists the security against rotation and the press-out resistance.

Through the size of the head part and the diameter of the sheet metal contact surface, in combination with the form-fitted connection with the sheet metal material and the axial press-out resistance, an adequate button-out resistance of the element is thus ensured.

Through the deformation of the sheet metal material in the ring-shaped recess a firm contact of the head part on the sheet metal part is achieved, whereby deformations and distortions of the sheet metal part in the region of the head part of the element can be avoided. The ring groove furthermore forms a receiving space for the material that arises through the generation of the radial grooves or recesses, so that the corresponding raised material portions do not disturb the transition from the head part into the shaft part.

Furthermore, the attachment between the functional element and the sheet metal part in the region of the transition from the shaft part into the head part can be realized in such a way that here a relatively small diameter of the shaft part and of the hole in the sheet metal part is present. In this way the later attachment of a further component to the side of the sheet metal part remote from the head part of the functional element can proceed without complications and the further component simply has to have a corresponding aperture. This attachment of a further component to the sheet metal part can thus take place in such a way that the desired "direct clamp" is possible and indeed without having to operate with a load-distributing pierced washer.

Preferably from two to twelve radial recesses, preferably four to eight an d in particular six radial recesses are provided, with each radially projecting nose being provided between two adjacent radial recesses, i.e. the recesses and the noses are alternatingly arranged around the longitudinal axis of the functional element.

The undercuts are preferably located axially within the ring-shaped axial recess. At this position the said raised material portions of the shaft part enter into a high quality secured engagement with the sheet metal material without causing distortions of the sheet metal material, particularly since the sheet metal material can deviate into the axial ring recess of the head part during the compression.

The functional element is thus in one variant a bolt element having a thread at its shaft part, with the outer diameter of the thread having a radius which is larger than the (maximum) radial dimension from the longitudinal axis of the shaft part to the base surface of the radial recesses.

Furthermore, the outer diameter of the thread has a radius which is larger than the (maximum) radial dimension from the longitudinal axis of the shaft part to the radially outer surface of the radially projecting noses.

The base surfaces of the radial recesses and,or the outer surfaces of the noses preferably lie at least substantially on respective circular cylindrical surfaces, or they form segments of such circular cylindrical surfaces. The base surfaces of the recesses then have a constant radial dimension as do also the outer surfaces of the noses. This is, however, not absolutely essential, since other contours of the corresponding surfaces would be possible, whereby the said radial dimensions would not have to be constant; however, it is still possible to speak of the maximum radial dimension.

Since the said maximum radial dimensions of the alternating noses and recesses are preferably smaller than the outer diameter of the thread it can be ensured that the sheet metal material lies radially within the outer diameter of the thread and the previously mentioned axial security of the bolt element is ensured.

In this connection, the raised material portions forming the undercuts can have a maximum radial dimension measured from the central longitudinal axis of the functional element which corresponds at least substantially to the radial dimension of the thread or indeed can be somewhat larger, whereby an improved security against rotation is achievable.

The thread is preferably arranged at its end adjacent the head part directly before the ends of the radial recesses or noses remote from the head part. In this way, not only is the desired "abutment" for the sheet metal material formed at a favorable position, but also the thread can be manufactured without problem by a thread rolling process, since the axial length of the noses and recesses signifies that the thread runs out before the head part. This facilitates the thread rolling process, since this is no longer carried out, as in the EBF bolt, directly up to the head part.

When the press-in element is a hollow element, whose hollow central passage is provided with the thread or can be provided with the thread, then the shaft part can likewise be executed at the side of the noses and recesses remote from the head part with a diameter which is larger than the diameter of the shaft part in the region of the noses. This can, for example, be achieved by an axial compression or upsetting process.

Furthermore, the free end face of the shaft part can be designed, irrespective of whether the diameter is larger than the diameter of the shaft part in the region of the noses, for the piercing of the sheet metal part, so that the nut element on insertion into the sheet metal part cuts its own hole in the sheet metal part together with a die button. I.e. the nut element is made self-piercing.

On the attachment of the functional element of the invention to a sheet metal part a component assembly arises, with the special characterizing feature that the sheet metal part extends within the ring recess, into the axial recesses and into the undercuts and hereby ensures the required resistance to press-out and the required security against rotation.

The component assembly is preferably so designed that the side of a sheet metal part remote from the head part in the region adjacent to the shaft part is arranged, with a bolt element, directly before the end of the thread adjacent to the head part and, with a hollow element, directly before an end section of the hollow shaft part.

The component assembly is so designed, particularly with relatively thin sheet metal parts with approximately 1 to 1.5 mm thickness, that the sheet metal part has a ring-like collar at the side remote from the head part, the radially inner surface of which closely contacts the noses and,or the base surfaces of the radial recesses. In this connection, the ring collar can have an axial length beneath the lower side of the sheet metal of for example 1 to 3 mm, approximately corresponding to the length of the noses.

For thicker sheet metal parts above 1 or 1.5 mm thickness, the sheet metal part is so embossed by a nose or a ring nose of a die button that the sheet metal material extends at least substantially over the full axial length of the noses. A big advantage of the functional element of the invention is that one element can be used with sheet metal parts of different thicknesses, for example from 0.6 to 4 mm, which makes the storage and the costs for the user more favorable.

Through the compression of the sheet metal part by the corresponding die button on attachment to the sheet metal part, the sheet metal material is caused to flow and then lies as a result between the raised material port ions against the surface of the element.

A method of manufacturing the functional element of the invention in the form of a male element is characterized in that one starts from a cylindrical metal rod or wire and in a cold heading process generates a blank with a head part, with a shaft part and also with a ring-shaped axial recess, which surrounds the shaft part at the side of the head part adjacent to the shaft part, and preferably with a material collar around the shaft part in the region adjacent the head part; in that the material of the shaft part, and,or (if provided) of the collar, is locally displaced by a further cold heading process, in order to form the radial recesses extending in the axial direction and the raised material portions forming the undercuts at the ends of the radial recesses adjacent the head part, and also the noses arranged between the radial recesses, and in that an axially extending central passage is formed in the shaft part and in the head part.

A method for the manufacture of the function element in the form of a female element is characterized in that one starts from a cylindrical metal rod or wire and in a cold heading process generates a blank with a head part, with a shaft part and also with a ring-shaped axial recess, which surrounds the shaft part at the side of the head part adjacent to the shaft part, and preferably with a material collar around the shaft part in the region adjacent the head part; in that the material of the shaft part and,or (if provided) of the collar is locally displaced by a further cold heading process, in order to form the radial recesses extending in the axial direction and the raised material portions forming the undercuts at the ends of the radial recesses adjacent the head part, and also the noses arranged between the radial recesses, and in that an axially extending central passage is formed in the shaft part and in the head part.

In this connection the free end of the nut element can be compressed or upset in order to increase the radius of the free end from the longitudinal axis, so that this is larger than the radius of the shaft part in the region of the radial recesses and preferably of the radius of the shaft part in the region of the noses and optionally to form a piercing edge at the free end of the shaft part.

BRIEF DESCRIPTION OF THE FIGURES

The invention will be described in more detail in the following with reference to the accompanying drawings in which are shown.

DETAILED DESCRIPTION OF THE INVENTION

Referring to FIGS. 1A to 1D a function element 10 is shown there in the form of a press-in element which is designed for attachment to a sheet metal part 12 or 12' in accordance with FIGS. 2A to 2C and 3A to 3C respectively. The function element 10 has a head part 14 and a shaft part 16. The head part 14 has an annular or ring-shaped sheet metal contact surface 20 at the side 18 adjacent the shaft part 16 and within this an annular or ring-shaped axial recess 22 which surrounds the shaft part 16 at the transition from the head part into the shaft part 16. Furthermore, the shaft part 16 has, in this example, six circumferential distributed radial recesses 24 extending in the axial direction and between them likewise six axially extending and radially projecting noses 26, which alternate with the radial recesses along the central longitudinal axis 28 of the bolt element. At the positions of the radial recesses 24 raised material portions 30 are present at their axial ends adjacent the head part, which form undercuts 32 with the head part in the region of the ring-shaped axial recess 22.

The axially extending radial recesses are produced during the manufacture of the element from a cylindrical region of a blank, which has the same diameter as the radially outer sides 34 of the noses 26.

Figure 1A:
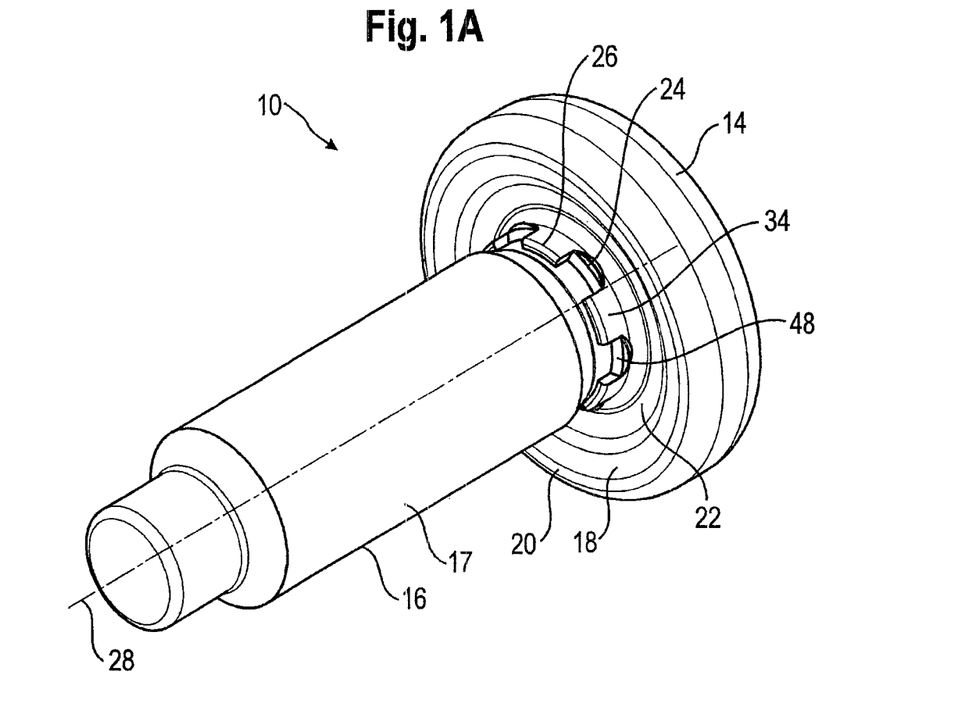
FIG. 1A: a perspective illustration of a function element in accordance with the invention in the form of a bolt element.
Figures 1B, 1C:
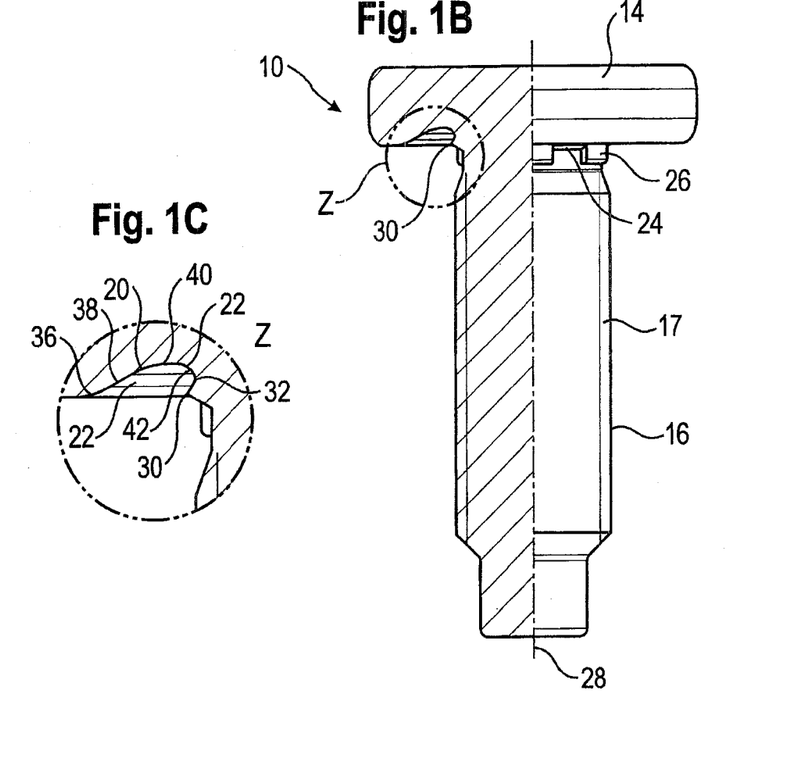
FIG. 1B-1D: illustrations of the bolt element of the invention of FIG. 1A in a side view partly sectioned in the longitudinal direction (FIG. 1B), an enlarged representation of the encircled region in FIG. 1B at the transition from the head part into the shaft part (FIG. 1C) and an end view on the free end of the shaft part of the bolt element (FIG. 1D)
Figure 1D:
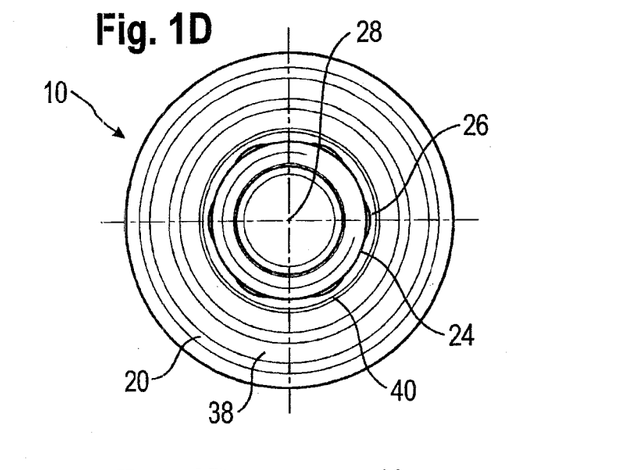

One can furthermore see that the outer diameter of the thread 17 has a radius which is larger than the (maximum) radial dimension of the longitudinal axis 28 of the shaft part 16 from the base surface 48 of the radial recesses 24. Furthermore one can see that the outer diameter of the thread 17 has a radius which is larger than the (maximum) radial dimension from the longitudinal axis 28 of the shaft part 16 to the radially outer surface of the radially projecting noses 26.

The base surfaces 48 of the radial recesses 24 and,or of the external surfaces of the noses 26 lie in this embodiment on respective circularly cylindrical surfaces, or form segments of such circular cylindrical surfaces. The bolt element thus has a cross-sectional shape in the region of the noses similar to that of a splined shaft. The base surfaces 48 of the recesses 24 thus have a constant radial dimension as do also the outer surfaces of the noses 26.

The shaping of the axial ring recess 22 in cross-section can in particular be seen from FIG. 1C. It is first pointed out that, in contrast to an EBF bolt or an RND nut, no radially extending ribs providing security against rotation are provided which bridge the ring recess or the ring groove 22. The ring recess 22 has a radially outwardly disposed oblique flank 36 which merges via a rounded transition 38 into the ring-shaped sheet metal contact surface 20. The base region 40 of the ring groove is likewise formed with a gentle curvature 42 and merges via a rounded surface (not shown but designed with a form corresponding to the radius 44 of the undercuts 32) into the shaft part 16 between the raised material portions 30. One can further see from FIG. 1C that the undercuts 32 are located axially within the ring groove 22.

The raised material portions 30 forming the undercuts 32 have a maximum radial dimension measured from the central longitudinal axis 28 of the function element which at least substantially corresponds to the radial dimension of the thread 17 or is indeed somewhat larger, whereby an improved security against rotation can be achieved.

In other respects, the ring recess has an approximately rectangular cross-sectional shape with an inclined flank 36. The precise cross-sectional shape is not critical, but sharp edges should be avoided as far as possible.

The preferred dimensions of the bolt element and also of the nut element 10' in accordance with FIGS. 4A to 4D can be taken from the drawings which are true to scale if one is a basic dimension for the scaling the diameter of the thread, for example of an M6 or M8 thread.

The transitions between the noses 26 and the radial recesses 24 are preferably formed as radial flanks 46, i.e. flanks which lie in radial planes to the longitudinal axis 28. In this way the security against rotation can be ensured. Although six noses 26 and six radial recesses are preferred with approximately the same angular extent, a different number of noses 26 and radial recesses 24 and also different angular extents for these can be selected. Too many noses and radial recesses, for example more than twelve of both are normally unfavorable, because it is difficult to form these and simultaneously ensure a high security against rotation. A number of noses 26 and of the radial recess of less than three or four also makes it difficult to ensure the desired security against rotation.

Figure 2A:
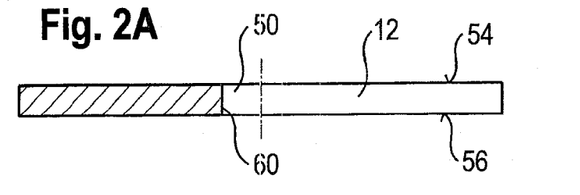
FIGS. 2A-2C: a series of drawings to illustrate the attachment of the bolt element in accordance with FIGS. 1A to 1D to a relatively thick sheet metal part.
Figure 2B:
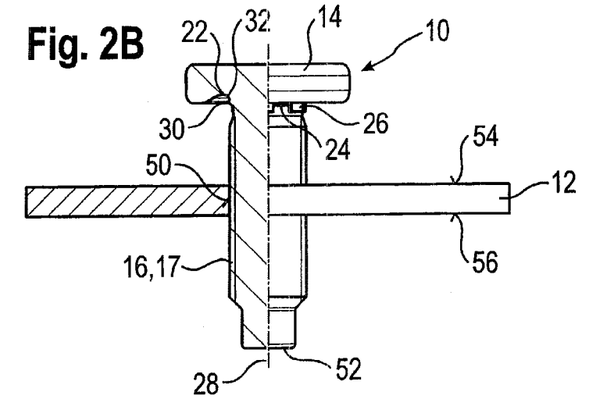
Figure 2C:
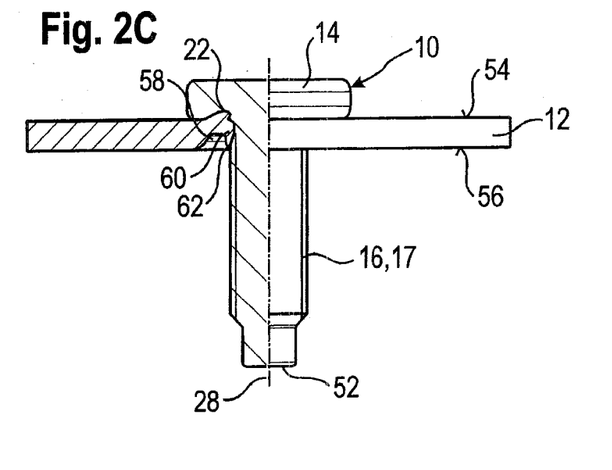

FIGS. 2A to 2C now show the attachment of the bolt element of FIGS. 1A to 1D to a sheet metal part 12, which is here to be understood as a relatively thick sheet metal part of a thickness of 3 mm for an M8 thread. In this attachment of the bolt element, which can take place in a press or in a C-frame or by a robot in a manner known per se, the pre-pierced (smoothly pierced) sheet metal part 12 (FIG. 2A) has a hole or pierced hole 50 with a cylindrical shape with a diameter corresponding to that of the thread, i.e. in this example of 8 mm.

The shaft part 16 of the bolt element which is held by a corresponding tool or setting head (not shown) in the head part region is passed, with the free end 52 of the shaft part 16 to the fore, through the hole 50 (FIG. 2B). Thereafter, for example in a further closing movement of the press, the head part 14 is pressed against the upper side 54 of the sheet metal part 12, while this is supported at the lower side 56 of a die button (not shown). In this connection, the die button has a central opening which receives the shaft part 16 of the bolt element and a ring nose projecting from its planar end face with a shape complementary to that of the embossed ring recess 58 in the lower side of the sheet metal part 12. Through the embossing of the ring recess 58 the sheet metal material in an rim region 60 of the hole 50 is urged radially inwardly into the radial recesses 24, into contact with the base surfaces 48 of these recesses and also against the outer side 34 of the noses 26, and against the flanks of the noses 26, and furthermore axially upwardly into the axial ring recess 22, around the raised material portions 30 and also into the undercuts 32.

The finished component assembly is designed as is shown in FIG. 2C and it can be seen that the lower side of the sheet metal part 12 contacts the thread run-out 62 in the region of the hole rim 60. Through this and through the engagement of the sheet metal material into the undercuts 32 it was prevented that the bolt element 10 can be pushed upwardly out of the sheet metal part 12.

Furthermore, it should be pointed out that the contact in the sheet metal material at the thread run-out is possible also with inner sheet metal parts, when the corresponding die button is designed in order to so shape the sheet metal material in the region of the hole rim 60' that an adequate expansion of the sheet metal material takes place in this re-shaped region. The radially inwardly and axially upwardly directed movement of the sheet metal material is particularly expediently brought about by inclined flanks of the ring nose of the die button, which are reflected in the obliquely set sides 64 and 66 of the ring recess 58.

Figure 3A:
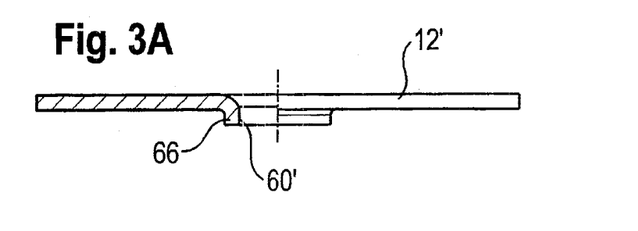
FIG. 3A-3C: a series of drawings to illustrate the attachment of the bolt element in accordance with FIGS. 1A to 1D to a relatively thin sheet metal part.
Figure 3B:
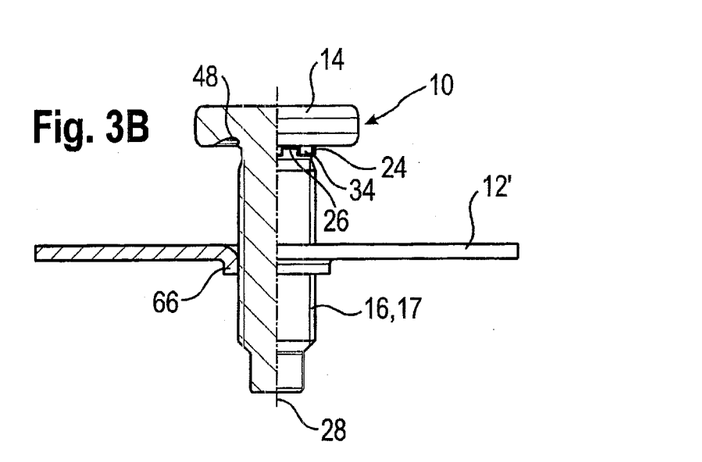
Figure 3C:
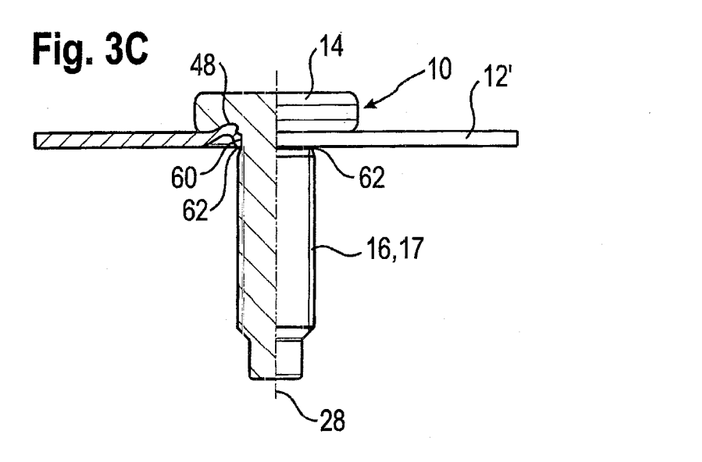
Figure 4A:
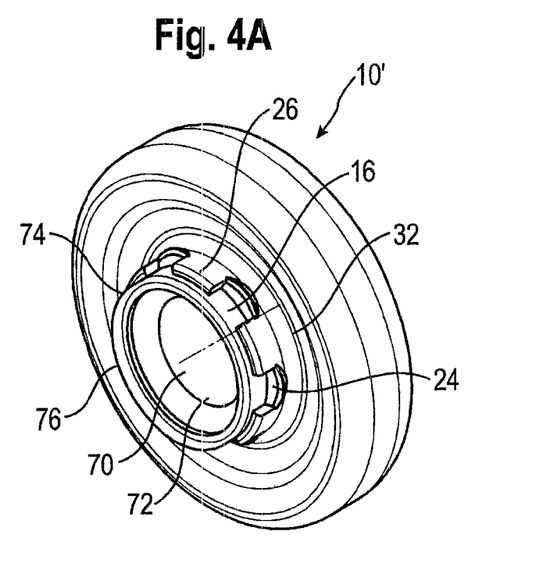
FIG. 4A-4D: a series of drawings corresponding to FIGS. 1A to 1D but for a function element in accordance with the invention in the form of a nut element.
Figure 4B:
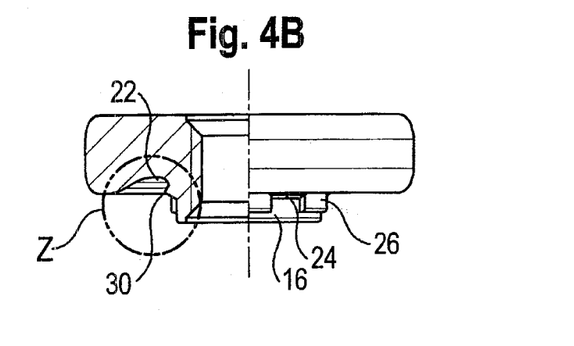
Figure 4C:
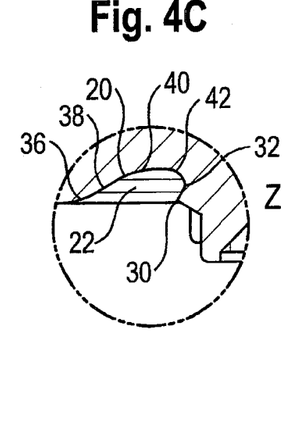
Figure 4D:
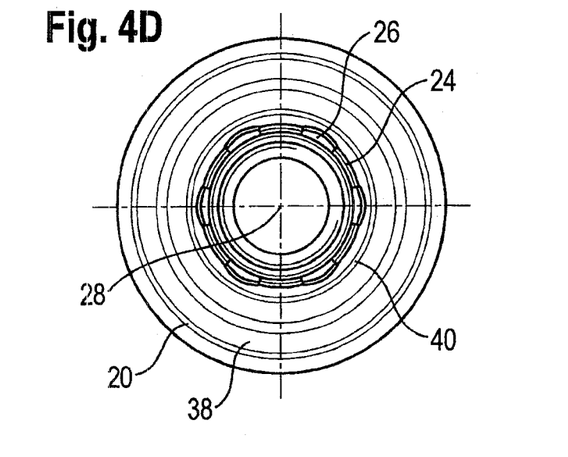
Figure 5A:
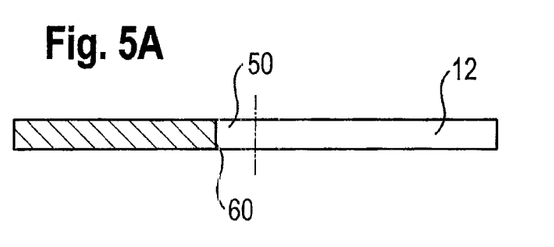
FIGS. 5A-5C: a series of drawings to illustrate the attachment of the nut element in accordance with FIGS. 4A to 4D to a relatively thick sheet metal part
Figure 5B:
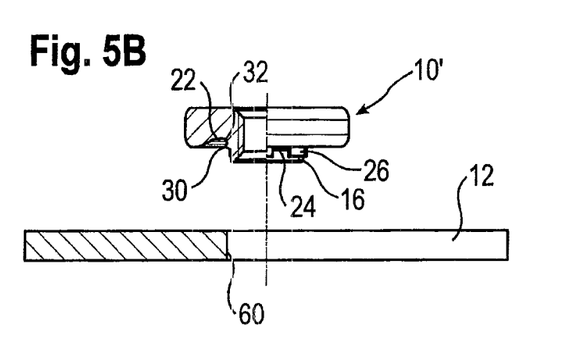
Figure 5C:
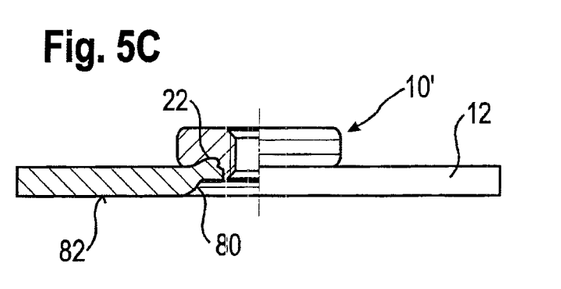
Figure 6A:
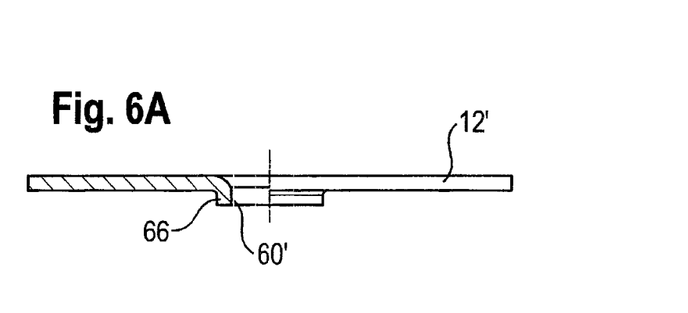
FIG. 6A-6C: a series of drawings to illustrate the attachment of the nut element in accordance with FIGS. 4A to 4D to a relatively thin sheet metal part.
Figure 6B:
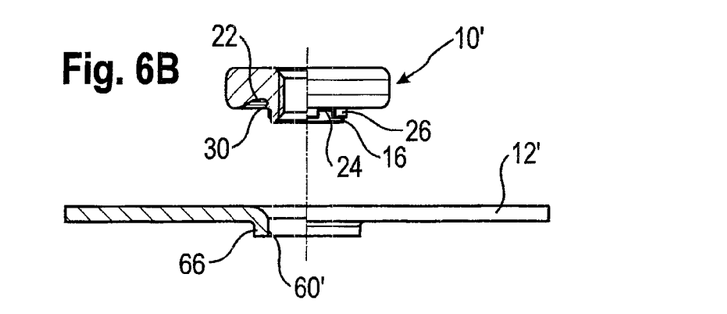
Figure 6C:
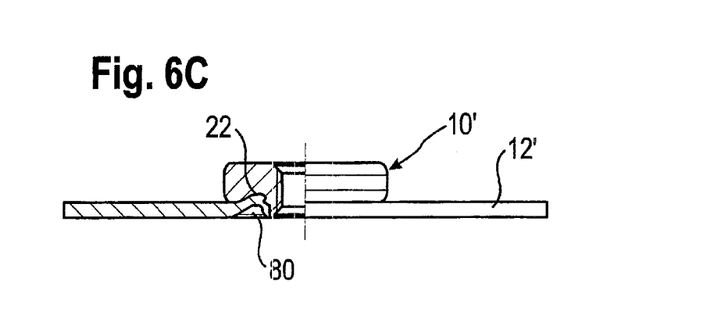

The attachment of the same bolt element 10 into a relatively thin sheet metal part is shown in FIGS. 3A to 3C. As can be seen in FIG. 3A the pierced hole is provided there with a downwardly projecting ring collar 66 which can take place through a sheet metal preparation known per se as in an EBF bolt.

The illustration in accordance with FIG. 3B corresponds to that of FIG. 2B apart from the thinner sheet metal part and the presence of the ring collar 66 and thus not therefore need to be especially described. Instead of this, the prior description also applies to this Figure. In any event, the concept that the same reference numerals are used for the same features or features for the same function applies for the whole description of the Figures, unless something to the contrary is stated. It is evident from FIG. 3C that the embossing of the sheet metal part by the ring nose of the die button also leads with a thin sheet metal part to the sheet metal material entering fully into engagement with the shaft part 16 of the bolt element in the region of the noses 26 and the radial recesses 24. In this connection the non-shown die button also have a central opening here which receives the shaft part 16 of the bolt element and a ring nose projecting from its planar end face with a shape complementary to that of the embossed ring recess 58 in the lower side of the sheet metal part 12. However, the die button here has a ring nose with an asymmetrical shape in order to take account of the shape of the ring collar and indeed so that the oblique side 64 of the ring recess 58 is longer than the oblique side 66. Through the embossing of the ring recess 58 the sheet metal material is also brought here in the rim region 60 of the hole 50, above all in the region of the ring collar 68, radially inwardly into the radial recesses 24 into contact against the base surfaces 48 of these recesses and also against the outer side 34 of the noses 26 and against the flanks of the noses 26. Furthermore the sheet metal material is urged axially upwardly in the axial ring recess 22 around the raised material portions 30 and also into the undercuts 32.

The finished component assembly is designed as is shown in FIG. 3C and it can also be seen here that the underside of the sheet metal part 12 contacts the thread run-out 62 or lie directly above the latter in the region of the hole rim 60 of the ring collar which is slightly re-shaped by the nose of the die button. In this way and through the engagement of the sheet metal material into the undercuts 32 it is prevented that the bolt element 10 can be pressed upwardly out of the sheet metal part 12.

Furthermore, it should be pointed out that the contact of the sheet metal material against or directly before the thread run-out it is possible with even thinner sheet metals when the corresponding die button is designed in order to so re-shape the sheet metal material in the region of the hole rim 60', or of the ring collar 68, that an adequate extension of the sheet metal material in height takes place in this re-shaped region. The radially inwardly and axially upwardly directed movement of the sheet metal material is brought about particularly expediently by suitable flanks of the ring nose of the die button, which are reflected in the obliquely set sides 64 and 66 of the ring recess 58.

Thus, with the embodiment of the shaft part 16 with the thread 17 the sheet metal material is so deformed—irrespective of whether it is in the form of thinner sheet metal parts or a thicker sheet metal part—for a common bolt element and only by means of slightly different die buttons matched to respective sheet metal part thickness, that the sheet metal material contacts the element in the desired manner. Specifically, the re-shaping of the sheet metal part takes place in such a way that the region 60' of the sheet metal material remote from the head part 14 of the functional element 10 lies opposite to the axial end of the thread 17 adjacent the head part and radially within the outer diameter of the thread 17. In this way, even with slight, loosening of the function element of the sheet metal part, an axial loss of the element is prevented, since the sheet metal material abuts against the end of the thread or can abut against it.

An example for a female, i.e. a hollow press-in element is shown in FIGS. 4A to 4D. In the drawings in accordance with FIGS. 4A to 4D and also FIGS. 5A to 5C and 6A to 6C, the same reference numerals are used as for the previous Figures and the previous description thus also applies in the same sense also for these Figures, which is why only the important distinctions would be discussed here.

The nut element 10' has a hollow central passage 70 which is provided with an internal thread 72. The shaft part 16 is provided here with a diameter in the region of a cylindrical section 74 of its free end, which corresponds to the diameter of the shaft part in the region of the base surface 48 of the radial recesses 24. The end face 76 of the element is provided with a small radius, can however also be provided with a shaft edge at this point. The element can be inserted in self-piercing manner into the sheet metal part. Instead of the shown form, the shaft part can also be designed at the side of the noses and recesses remote from the head part, i.e. in the region 74, which is larger than the diameter of the shaft part 16 in the region of the noses 26. This, as also a somewhat sharp piercing edge, can for example be achieved by an axial compression or upsetting process on the shaft part after the formation of the noses 26 and the radial recesses 24.

The free end 76 of the shaft part 16, irrespective of whether the diameter is larger than the diameter of the shaft part 16 in the region of the noses 26 or not, can thus be designed to pierce the sheet metal part so that the nut element 10' cuts its own hole in the sheet metal part on insertion into the sheet metal part in conjunction with a suitable die button. I.e. the nut element 10' is made self-piercing.

On the attachment of the functional element 10' in accordance with the invention to a the sheet metal part 12 as shown in FIGS. 4A to 4D, or to a sheet metal part 12' in correspondence with the FIGS. 5A to 5C and 6A to 6C, a component assembly arises with the special characterizing feature that the sheet metal part extends within the ring recess 22 into the radial recesses 24 and into the undercuts 32 and hereby ensures the required press-out resistance and the required security against rotation.

When the element is so designed, 1 hat the section 74 is of larger diameter than the shaft part 16 in the region of the noses, the end face 76 of the element lies axially within a recess 80 of the sheet metal part before the side of the sheet metal part remote from the head part outside of the recess 80. The precise design of the recess 80 is realized by a complementary shaping of the ring nose of the die button (not shown). In this manner, a planar screw joint attachment surface 82 for a component which is to be screwed into place (not shown) is present which corresponds to the lower side of the sheet metal part 12, 12'. One notes that with thin sheet metal parts 12' the axial depth of the ring recess 22 is exploited in order to provide an adequate constructional height for the attachment to the sheet metal part 12'.

If an enlarged diameter of the shaft part 16 is provided in the section 74 then an additional axial press-out resistance is achieved because a shoulder formed there, similarly or corresponding to the thread run-out with a bolt element. In this way, a very similar design of the attachment of the sheet metal part to the element can be achieved for a female element as for a bolt element.

A method for the manufacture of a functional element in accordance with the invention in the form of a male element is characterized in that one starts from a cylindrical metal rod or wire and in a cold heading process generates a blank with a head part 14, with a shaft part 16 and also with a ring-shaped axial recess 22, which surrounds the shaft part 16 at the side of the head part 14 adjacent to the shaft part. A material collar is preferably produced around the shaft part 16 in the region adjacent the head part 14 and indeed preferably with a diameter which corresponds to that of the noses in the finished element. This material collar is locally displaced by a further cold heading process, in order to form the radial recesses 24 extending in the axial direction and the raised material portions 30 forming the undercuts 32 at the ends of the radial recesses 24 adjacent the head part 14, and also the noses 26 arranged between the radial recesses 24. Thereafter the thread 17 is formed on the shaft part shortly before or directly before the axial ends of the radial recesses remote from the head part 14 by a rolling process. In this way the diameter of the shaft part increases so that the outer diameter of the thread becomes larger than that of the noses 26.

A method of manufacturing a functional element in the form of a hollow press-in element is characterized in that one starts from a cylindrical metal rod or wire and in a cold heading process generates a blank with a head part 14, with a shaft part 16 and also with a ring-shaped axial recess 22, which surrounds the shaft part 16 at the side of the head part 14 adjacent to the shaft part, and preferably with a material collar around the shaft part 16 in the region adjacent the head part 14; in that the material of the shaft part 16 and,or (if provided) of the collar is locally displaced by a further cold heading process in order to form the radial recesses 24 extending in the axial direction and the raised material portions 30 forming the undercuts 32 at the ends of the radial recesses 24 adjacent the head part 14 and also the noses 26 arranged between the radial recesses 24; and in that an axially extending central passage 70 is formed in the shaft part 16 and in the head part 14.

In all embodiments all materials can be named as an example for a material of the functional elements which achieve the strength values of class 8 in correspondence to the ISO standard or higher in the context of cold deformation, for example a 35B2 alloy in accordance with DIN 1654. The so formed fastener elements are suitable amongst other things for all commercially customary steel materials for drawing quality sheet metal parts and also for aluminum or its alloys. Aluminum alloys, in particular those of higher strength can be used for the functional elements, for example AlMg5. Also functional elements of higher strength magnesium alloys such as AM50 can be considered.

List of Reference Numerals

10, 10' bolt element, nut element
12, 12 sheet metal part
14 head part
16 shaft part
17 thread
18 lower side of the head part
20 sheet metal contact surface
22 axial recess
24 radial recess
26 noses
28 central longitudinal axis
30 raised material portion
32 undercut
34 radial outer side of the noses
36 lateral flank
38 transition
40 base region of the ring groove
42 curvature
44 radius
46 radial surface
48 base surface
50 pierced hole
52 end face
54 top side of the sheet metal part
56 lower side of the sheet metal part
58 ring recess in the sheet metal part
58' ring recess in the sheet metal part
60 rim region of the pierced hole
60' re-shaped rim region of the pierced hole
62 thread run-out
64 side of the ring recess 58
66 side of the ring recess 58
68 ring collar
70 central passage
72 internal thread
74 cylindrical section
76 end face of the nut element
80 recess of the sheet metal part
82 planar surface of screwed joint

The invention claimed is:

1. A functional element in the form of a press-in element for attachment to a sheet metal part, the functional element having a head part and a shaft part, the head part having a ring-shaped sheet metal contact surface at the side adjacent the shaft part and a ring-shaped axial recess inside this ring-shaped sheet metal contact surface and surrounding the shaft part at a transition from the head part into the shaft part, and the shaft part having a plurality of circumferentially distributed radial recesses extending in the axial direction and between these noses which likewise extend axially and project radially, there being raised material portions present adjacent the head part and forming undercuts with the head part in the region of the ring-shaped recess and the raised material portions being present at the positions of the radial recesses at axial ends of the radial recesses adjacent the head part.

2. A functional element in accordance with claim 1, having from two to twelve radial recesses and each radially projecting nose being between two adjacent radial recesses.

3. A functional element in accordance with claim 1, the undercuts being located within the ring-shaped axial recess.

4. A functional element in accordance with claim 1, it being a bolt element having a thread at its shaft part, the outer diameter of the thread having a radius which is larger than a radial dimension from a longitudinal axis of the shaft part to the base surface of the radial recesses.

5. A functional element in accordance with claim 4, wherein the outer diameter of the thread has a radius which is larger than a radial dimension from a longitudinal axis of the shaft part to a radially outer surface of the radially projecting noses.

6. A functional element in accordance with claim 4, wherein the raised material portions forming the undercuts have a maximum radial dimension measured from the central longitudinal axis of the functional element which at least substantially corresponds to a radial dimension of the thread.

7. A functional element in accordance with claim 4, the thread being arranged at its end adjacent the head part directly before ends of the radial recesses or of the noses remote from the head part.

8. A functional element in accordance with claim 1, wherein base surfaces of the radial recesses and outer surfaces of the noses lie at least substantially on respective circularly cylindrical surfaces or form segments of such circularly cylindrical surfaces.

9. A functional element in accordance with claim 1, the press-in element being a hollow element having a hollow central passage, which is provided with a thread or can be provided with a thread.

10. A functional element in accordance with claim 1 in combination with a sheet metal part thus forming a component assembly, the sheet metal part extending within the ring recess and into the undercuts and hereby ensuring the required press-out resistance and/or the required security against rotation.

11. A functional element and sheet metal part combination in accordance with claim 10, the functional element being a bolt element having a thread and a side of the sheet metal part remote from the head part being arranged adjacent to the shaft part directly before an end of the thread adjacent the head part.

12. A functional element and sheet metal part combination in accordance with claim 10, the functional element being a hollow element having a hollow shaft part and a side of the sheet metal part remote from the head part being arranged adjacent to the shaft part before a free end face of the hollow shaft part.

13. A functional element and sheet metal part combination in accordance with claim 10, the sheet metal part having a ring collar at a side remote from the head part, the ring collar having a radially inner surface closely contacting at least one of the noses and base surfaces of the radial recesses.

14. A functional element and sheet metal part combination in accordance with claim 13, the functional element being a bolt element having a thread and the ring collar having an axial end remote from the head part adjacent to the shaft part and arranged directly before an end of the thread adjacent the head part.

15. A functional element and sheet metal part combination in accordance with claim 13, the functional element being a hollow element having a hollow shaft and the ring collar having an axial end remote from the head part adjacent to the shaft part and arranged directly before a free end face of the hollow shaft part.

16. A functional element and sheet metal part combination in accordance with claim 13, there being raised material portions present adjacent the head part and forming undercuts with the head part in the region of the ring-shaped recess, the sheet metal material contacting a surface of the element between the raised portions.

* * * * *